E. FEUILLETTE.
APPARATUS FOR STEEPING OR RETTING FLAX, HEMP, AND THE LIKE.
APPLICATION FILED FEB. 18, 1911.

1,152,159.
Patented Aug. 31, 1915.

UNITED STATES PATENT OFFICE.

EMILE FEUILLETTE, OF BOULOGNE, SEINE, FRANCE, ASSIGNOR TO SOCIÉTÉ ETABLISSEMENTS E. FEUILLETTE, OF BOULOGNE-SUR-SEINE, FRANCE.

APPARATUS FOR STEEPING OR RETTING FLAX, HEMP, AND THE LIKE.

1,152,159.      Specification of Letters Patent.      Patented Aug. 31, 1915.

Application filed February 18, 1911. Serial No. 609,316.

*To all whom it may concern:*

Be it known that I, EMILE FEUILLETTE, a citizen of the French Republic, residing at Boulogne, Seine, France, have invented a certain new and useful Improved Apparatus for Steeping or Retting Flax, Hemp, and the like, of which the following is a specification.

This invention relates to an improved process by means of which flax, hemp, etc., can be retted industrially or on a large scale. The process is quick, inexpensive and can be used for large quantities of ligneous textiles simultaneously treated. The treatment may be compared to the river method, over which it has the following advantages: The water has a constant temperature regulated for instance between 25 and 30°, and it circulates at a slow and absolutely regular speed. The temperature and the speed of the water are regulated so as to insure both the production and the preservation of the ferments. The supply of water is determined at will, and its circulation is uniform and homogeneous throughout the whole volume that it fills. The escape of this water takes place automatically, and is strictly in accordance with the supply. The water follows a regular course which causes it to pass slowly through the balloons. The fermenting work is easy to watch and regulate for each of the balloons in the course of treatment. Heavy material such as earth, gummy portions, etc., are collected at the bottom of the apparatus, and continuously discharged, so that they can be utilized for instance as manure. When the apparatus is to be emptied, a basin or tank arranged upstream, insures the preservation of water charged with ferments, and constituting a culture bouillon for the microbes. From the hygienic point of view, the gases produced are constantly discharged by means of a suitable suction. Finally, this methodical process necessitates a small expenditure of water, and consequently brings about only a very moderate discharge of residuary water.

The drawings accompanying the present specification, show, by way of example, a typical installation of this process of industrial retting.

Figure 1 shows such installation in cross-sectional elevation, and Fig. 2 is an elevation in longitudinal section, Fig. 3 is a longitudinal section in plan, Fig. 4 is a cross-sectional elevation of the water-distributing rack, and Fig. 5 is a longitudinal section in elevation.

With reference to these drawings, it will be seen that the apparatus consists of a long rectangular basin or tank 1, with a bottom inclined toward the center (Figs. 1–3) intended to receive the balloons. Up-stream of the same is arranged a water mixing vat 2. The water required for the retting process is distributed and supplied by a rack constituted by pipes 3. A dam or weir 4 arranged at the end of the tank 1, fixes and maintains a constant level of water whatever be the supply upstream. Any excess escapes through the discharge grooves 5. On the other hand, next to the dam 4 is arranged a transverse partition 6, forcing the water to escape through the bottom portion, so that a real siphon is thus produced.

Water is supplied through the main inlet pipe 7, and the cock or valve 8 enables the supply to be regulated (Figs. 2–5). The water passes first into a tank 9 which constitutes a collector for the rack and is provided with two superposed bottoms. The upper bottom 10 is perfectly level, and receives the supply pipes 3 and establishes a constant level for the distribution of the water. The collector tank 9 is provided with an inner bottom 11.

At the inlet of the vat 1 is arranged a dam 12 which enables the said vat to be emptied whenever desired by isolating it, if necessary. On the said dam or weir are arranged sluice valves 13 connected in pairs, operated by the traveling crane of the apparatus.

The longitudinal tank 1 is provided with a certain number of cages 14 called "balloons" and containing the flax or hemp to be treated. These cages are arranged in the same way one behind another, and transverse bars 15 provided with hooks, are used for operating them mechanically. Moreover, the said transverse bars guide and keep the cages in the vertical grooves 16 made in the lateral walls of the tank 1. Small vertical partitions 17 separate the balloons by hydraulic joint. On the other hand, a certain number of vertical partitions 18 break the current of water in the bottom of the tank 1. The said water is thus forced to circulate in a regular manner through the balloons 14.

At the lower portion of the tank 1 is arranged a central Archimedean screw 19 which collects and conveys heavy materials deposited, into the conical bottom of the said tank 1; a chain-wheel 20 operates the screw 19 by means of a transmission gear with a pulley 21 (Figs. 2 and 3). The foreign matters conveyed by the screw 19, are forced into the well 22. The latter receives a plunger pipe 23 connected to a suction pump and used for discharging heavy materials. A discharge opening 24 with a sluice valve or cock enables the tanks 1 and 2 to be completely emptied. A cover 25 is arranged on the top of the said tanks.

A main suction pipe 26 is connected to a suction fan (Figs. 1 and 3). It is connected to secondary conduits 27, separate for each balloon-compartment. These secondary conduits work between the upper water-level and the cover 25. The gases due to the fermentation, are thus conveyed either outside or into the chimney of the works.

A certain number of steam pipes 28 (Figs. 1 and 2) arranged below the balloons 14, are used for keeping constant the temperature of the retting water in the tanks that are working. The overhead traveling crane 29 insures all the operations of the balloons, their lowering, removal, turning over and conveying. This traveling crane is provided with a rotating frame 30 braced by transverse bars 31, pivoted to pins 32 (Figs. 1 and 2). Toothed wheels 33 drive the frame and are operated by the worms 34. Finally a set of gearing wheels and spindles 35 drives these worms 34. Guides 36 insure the guiding of the balloons in the carrying frame 30. Movable bottom tappets 37 are used for supporting the balloons 14 in the frame 30 when they are no longer supported by the winch 38 for turning them over. This mechanical winch 38 is also used for operating the balloons 14 and the sluice valve 13.

The retting being better at the upper portion of the balloons and down stream of the tank 2, the operation is carried out as follows:—Every two days, for instance, the balloons are withdrawn from the water, turned over by the frame 30 and then replaced into the water. But instead of lowering them again into the compartment from which they were withdrawn, they are lowered for instance into a compartment which is two or three compartments farther upstream, and so on, until the retting is completed. This operation is thus rendered very homogenous for the whole quantity treated.

What I claim as my invention and desire to secure by Letters Patent is:—

1. In an artificial river for retting textiles the combination with a siphon arranged down-stream, of baffles extending upwardly from the bottom and adapted to divide the stream of water into two layers and to impede and agitate the lower layer, a feeding reservoir arranged up-stream, a feeding device consisting of two compartments one of which has an inclined bottom, means for feeding hot water into the compartment having the inclined bottom and from thence into the second compartment, pipes terminating at the said reservoir, and fixed on the horizontal bottom of the said second compartment, an Archimedean screw arranged in a furrow in the bottom of the said river for discharging the residual heavy materials, and means for regulating the temperature of the circulating water.

2. In an artificial river for retting textiles, the combination with a siphon arranged down-stream, of baffles extending upwardly from the bottom and adapted to divide the stream of water into two layers and to impede and agitate the lower layer, a feeding reservoir arranged up-stream, a feeding device consisting of two compartments one of which has an inclined bottom, means for feeding hot water into the compartment having the inclined bottom and from thence into the second compartment, pipes terminating at the said reservoir, and fixed on the horizontal bottom of said second compartment, an Archimedean screw arranged in a furrow in the bottom of the said river for discharging the residual heavy materials, means for regulating the temperature of the circulating water, means for moving bales of material from a position downstream to a position up-stream, means for inverting said bales during their transport, and means for discharging the gaseous products of the fermentation.

In testimony whereof I have signed my name to this specification in the presence of two subscribing witnesses.

EMILE FEUILLETTE.

Witnesses:
   Dean B. Mason,
   Georges Bonnevil.